United States Patent
Ogasawara et al.

[11] Patent Number: 6,151,183
[45] Date of Patent: Nov. 21, 2000

[54] DISK DRIVE DEVICE AND METHOD FOR CONTROLLING THE SAME

[75] Inventors: Kenja Ogasawara, Fujisawa; Fuminori Sai, Yokohama; Shinji Ueno, Fujisawa; Isao Yoneda, Yokohama, all of Japan

[73] Assignee: International Business Machines Corporation, Armonk, N.Y.

[21] Appl. No.: 09/079,876

[22] Filed: May 15, 1998

[30] Foreign Application Priority Data

May 19, 1997 [JP] Japan ..................................... 9-128539

[51] Int. Cl.$^7$ .................................................. G11B 21/02
[52] U.S. Cl. ........................... 360/75; 360/97.02; 360/69
[58] Field of Search .................. 360/75, 97.02, 360/105, 69

[56] References Cited

U.S. PATENT DOCUMENTS

| | | | |
|---|---|---|---|
| 5,206,570 | 4/1993 | Hargarten et al. | 318/611 |
| 5,319,509 | 6/1994 | Michelson et al. | 360/77.03 |
| 5,377,058 | 12/1994 | Good et al. | 360/75 |
| 5,764,430 | 6/1998 | Ottesen et al. | 360/73.03 |

*Primary Examiner*—Andrew L. Sniezek
*Assistant Examiner*—Dan I. Davidson
*Attorney, Agent, or Firm*—Robert B. Martin

[57] ABSTRACT

The invention relates to a magnetic recording device which can be used at a reduced atmospheric pressure without having the head/slider assembly stick to the disk. A method of the present invention for controlling the operation of a disk drive device in reduced atmospheric pressure where a read/write head mounted on a head support arm flies above the surface of a rotating recording disk. The head support arm is moved along a radial direction of the recording disk to position the read/write head to one of cylinder positions of the recording disk. The method comprises steps of (i) detecting a value of the reduced atmospheric pressure during a power on reset period before a read/write period, (ii) storing information indicating whether the detected value of atmospheric pressure is lower than a threshold value, and (iii) accessing, during the read/write period, the stored information to determine whether an operation for lowering a flying height of the read/write head to a height which is lower than a height for the read/write operation should be inhibited.

7 Claims, 7 Drawing Sheets

DISK DRIVE DEVICE AND METHOD FOR CONTROLLING THE SAME

BACKGROUND OF THE INVENTION

1. Field of the Invention

The present invention relates to a method for controlling the operation of a hard disk drive device based upon a detected value of surrounding atmospheric pressure and a hard disk drive device capable of controlling its operation based upon the detected value of the atmospheric pressure.

2. Description of Related Art

At least one magnetic recording disk is contained in a hard disk drive device, and the data is stored on both surfaces of the magnetic recording disk. One read/write head is provided on each recording surface. In one example, four read/write heads are used with two recording disks; each read/write head is mounted on a front end of a head support arm, and rear ends of four head support arms are so connected to each other that all the read/write heads address the same radial cylinder positions on each of the four recording surfaces of the two recording disks. In this manner, all the read/write heads address the same radial positions of the four recording surfaces which define a cylinder, and as such the radial cylinder positions are called cylinder position.

A prior hard disk drive device used a contact start/stop scheme in which a head/slider assembly is landed on a rest region or a non-recording region located inside the inner most recording cylinder of a magnetic recording disk during a power off period, and takes off from the surface of the rest region when the magnetic recording disk is rotated. To realize a reliable take off, the surface of the disk must be roughened. The reasons for forming the roughness on the recording surface is that if the surface is made smooth, the head/slider assembly sticks to the recording surface due to interatomic forces, thereby preventing take off.

As the diameter of the magnetic recording disk becomes smaller, many efforts have been made to increase the recording density and to improve S/N ratio.

To increase the recording density and to improve S/N ratio, a flying height of the head/slider assembly, i.e., a space between the head/slider assembly and the recording surface of the disk has been decreased. In the magnetic recording disk, it was difficult to decrease the height of the head/slider assembly over the roughened recording surface, since the head/slider assembly tended to contact to top portion of the roughened surface.

Figure 1:
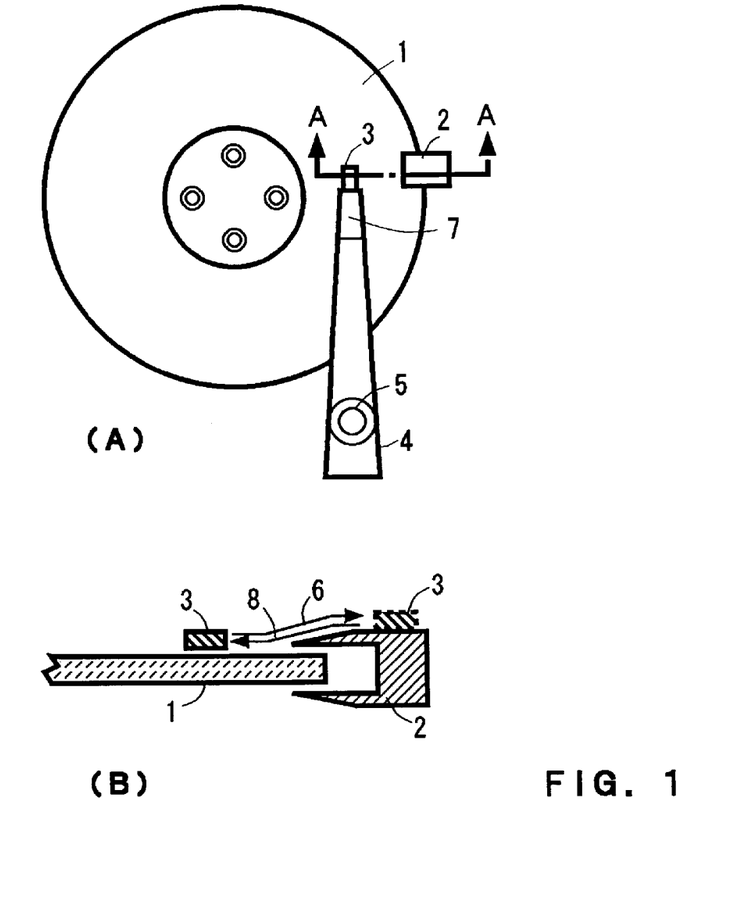
FIGS. 1(A) and 1(B) show the load/unload operation of the hard disk drive device.

A hard disk drive device has been developed which uses a load/unload scheme in which a ramp element 2 is mounted at the peripheral of the magnetic recording disk 1, as shown in the FIGS. 1(A) and 1(B). The surface of the ramp element 2 is ramped, and a front end 3 of a head support arm 4 rides on the ramped surface of the part 2, and moves in the direction of an arrow 6 to the rest position of the ramp element 2, as shown in FIG. 1(B), when the head support arm 4 is rotated around a pivot point 5 in the clockwise direction in FIG. 1(A). When the read/write operation is started, the magnetic recording disk 1 is rotated by a motor, not shown, and the head support arm 4 is moved from the rest position in a direction of an arrow 8, and is moved to a flying position above the desired cylinder of the magnetic recording disk 1 to read the data from the cylinder or write the data into the cylinder.

The rotational speed, i.e., the revolution per minute (RPM), of the magnetic recording disk 1 is so designed to generate an air bearing with an appropriate pressure which causes the head/slider assembly 7 of the head support arm 4 to fly above the surface of the magnetic recording disk 1.

In this manner, the head/slider assembly 7 does not land on the surface of the disk 1, so that the surface of the disk 1 can be polished to remove the roughness of the surface of the disk used in the contact start/stop scheme, and the flying height of the head/slider arm 4 in the read/write mode and an error recovery mode can be reduced in comparison with the flying height of the contact start/stop scheme.

Figure 2:
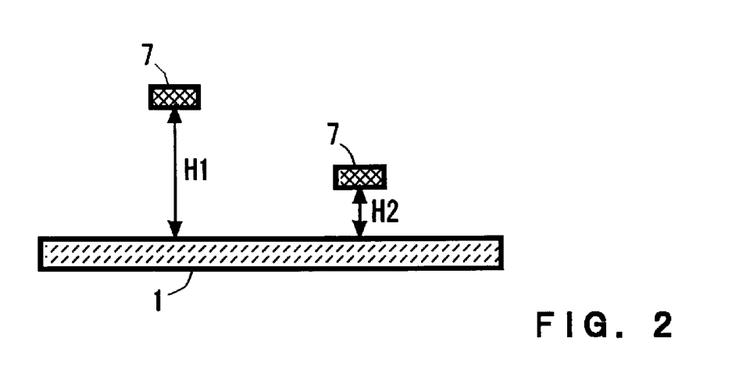
FIG. 2 shows the flying height of the head in the read/write operation.

Describing the flying height of the head/slider assembly 7 in the read/write mode and the error recovery mode with reference to FIG. 2, in the read/write mode, the flying height of the head/slider assembly 7 is maintained at the height H1 by maintaining the first rotation speed. If the hard disk drive device senses a read error or a write error, the hard disk drive device enters the error recovery mode by reducing the rotational speed of the disk 1 to a second rotational speed which is lower than the first rotational speed to maintain the height H2. This height H2 is so selected to bring the lower surface of the head/slider assembly 7 close to the surface of the disk 1 to wipe off any dusts or residual material on the surface of the magnetic recording disk 1.

The problem found by the inventors of the present invention is that the head/slider assembly 7 tends to stick to the surface of the magnetic recording disk 1 when the hard disk drive device enters the error recovery mode while the hard disk drive device is used in an airplane flying at a high altitude.

SUMMARY OF THE INVENTION

In accordance with the present invention, a method is provided for controlling a hard disk drive device operated in an unknown atmospheric pressure.

In the hard disk drive device, a read/write head mounted on a head support arm flies above a surface of a rotating recording disk, and the head support arm is moved by a head moving means along a radial direction to position the read/write head over one of the cylinder positions of the recording disk.

In the method, a value of the unknown atmospheric pressure is detected during a power on reset period before a read/write period. The information indicating whether the detected value of the unknown atmospheric pressure is lower than a threshold value is stored in a memory. The stored information is used during the read/write period to determine whether an operation for lowering a flying height of the read/write head to a height which is lower than a height for the read/write operation should be inhibited.

The value of the unknown atmospheric pressure is detected by the steps of (i) detecting a current value applied to the head moving means to keep the read/write head at a selected cylinder position, (ii) comparing the detected current value with a reference current value which represents a current value applied to the head moving means to keep the read/write head at the selected cylinder position at a reference atmospheric pressure, (iii) generating a difference value between the detected current value and the reference current value, and (iv) comparing the difference value with a threshold value to generate the information.

When the information indicates that the detected value of the unknown atmospheric pressure is lower than the threshold value, the operation for lowering the flying height of the read/write head is inhibited.

The selected cylinder position is at least one cylinder position of the outer most cylinder position and the inner most cylinder position.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION OF THE PREFERRED EMBODIMENTS

In the process of the present invention, (1) the flying heights H1 and H2 in the read/write mode and the error recovery mode are determined at atmospheric pressure, and (2) the pressure of the air bearing between the head/slider assembly 7 and the surface of the magnetic recording disk 1 is mainly determined by (a) the rotational speed of the disk 1 and (b) the value of the surrounding atmospheric pressure.

The inventors of the present invention have performed an analysis of the effects of the atmospheric pressure on the air bearing.

Figure 3:
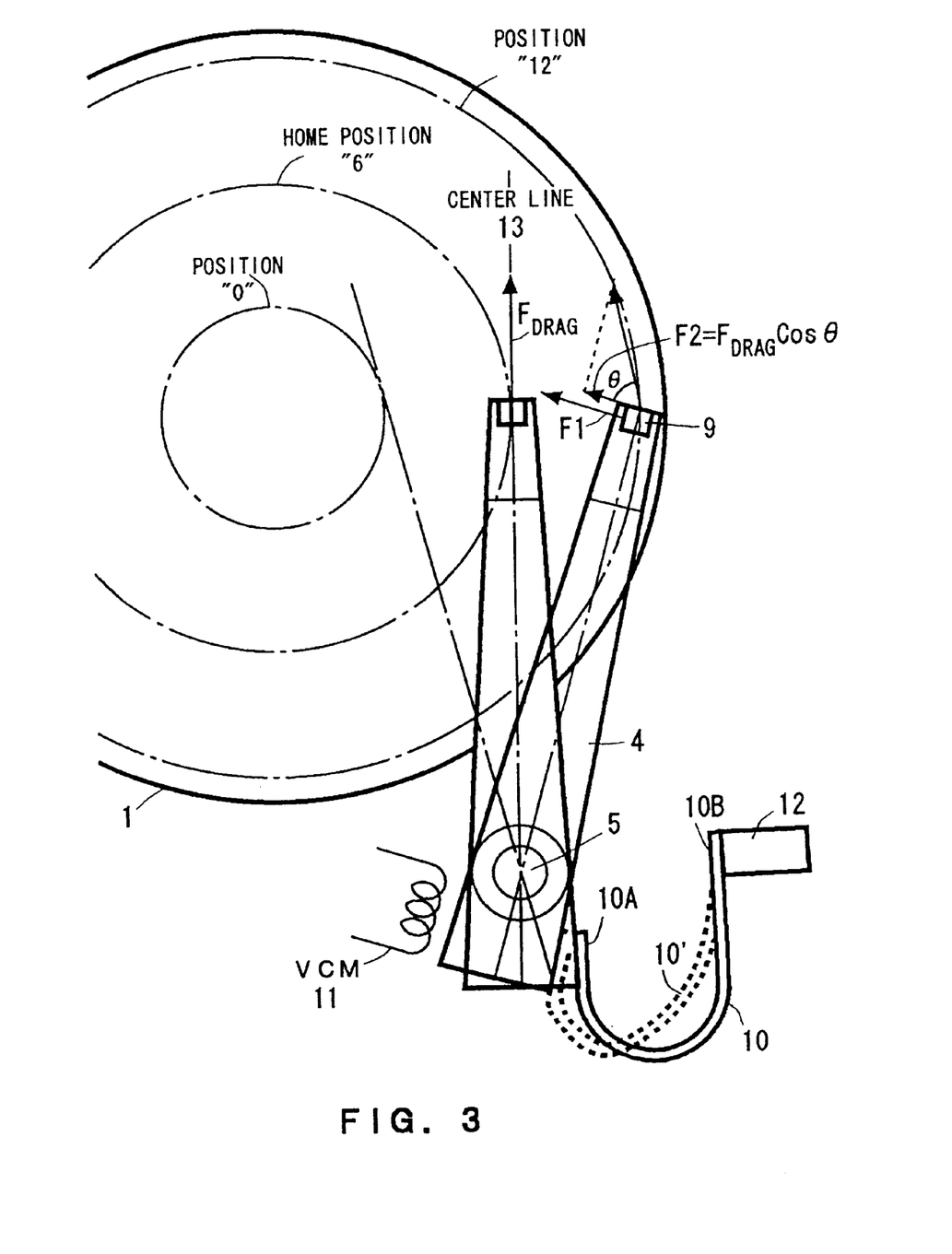
FIG. 3 shows the various force generated on the head support arm.

FIG. 3 shows the magnetic recording disk 1 and the head support arm 4 pivoted at the pivot point 5. Only a read/write head 9 is shown in FIG. 3 for simplifying the drawing. One end 10A of a flexible cable 10 having a plurality of electrically conductive wires is connected to the rear end of the head support arm 4. These wires are used to apply data signals to the head 9 and receive from the read/write head 9 the data signals and the position signals read from each of the radial positions, i.e., the cylinders, of the magnetic recording disk 1. The other end 10B of the flexible cable 10 is connected to a read/write circuit 12. The movement of the head support arm 4 and the read/write head 9 in the radial direction of the recording disk 1 is controlled by a voice coil motor (VCM) 11.

Figure 4:
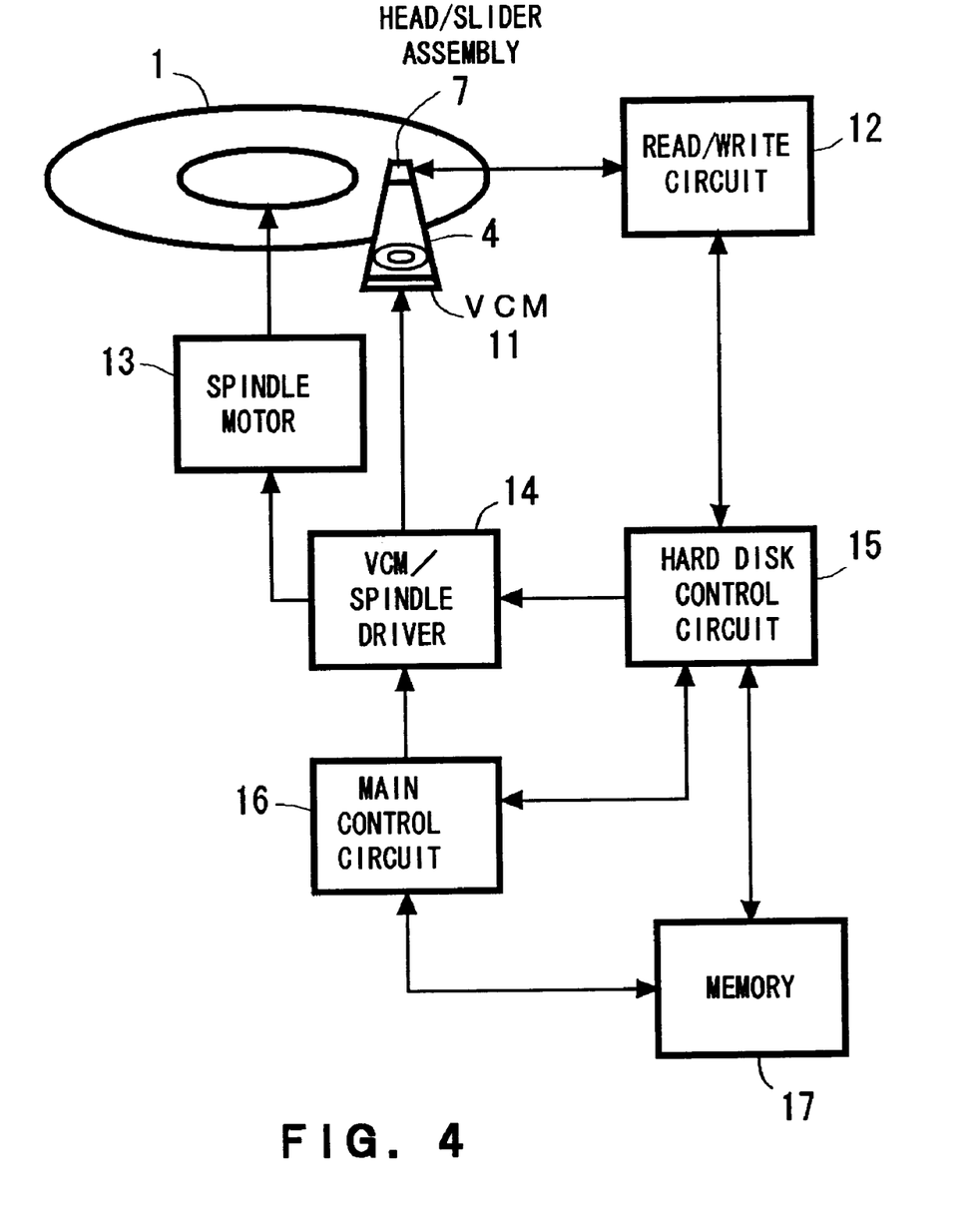
FIG. 4 shows the block diagram of the circuit of the hard disk drive device.

FIG. 4 shows a block diagram of the circuits included in the hard disk drive device. A spindle motor 13 for rotating the magnetic recording disk 1 and the VCM 11 are controlled by a VCM/spindle driver 14. The read/write circuit 12 is connected to a hard disk control circuit 15, which in turn is also connected to the VCM/spindle driver 14. A memory 17 is connected to the circuit 15 and a main control circuit 16, which controls the VCM/spindle driver 14, the hard disk control circuit 15 and the memory 17.

Again, referring to FIG. 3, since end 10B of the flexible cable 10 is fixed on the read/write circuit 12, end 10A applies a force to the rear end of the head support arm 4. This force of the flexible cable 10 applied to the rear end of the head support arm 4 is adjusted to keep the read/write head 9 of the head support arm 4 at the home cylinder position "6" (i.e., the center line 13 of the magnetic recording head) when the VCM 11 is not activated.

In other words, the flexible cable 10 applies a bias force to the head support arm 4 to position the head 9 at the home cylinder position "6", when the VCM 11 is not activated. In this manner, the read/write head 9 is held at the home cylinder position "6" by the force applied by the flexible cable 10 when the VCM 11 is not activated. The VCM 11 is then activated to move the head 9 from the home cylinder position "6" to any cylinder position, such as the outer most cylinder position "12" or the inner most cylinder position "0".

Figure 5:
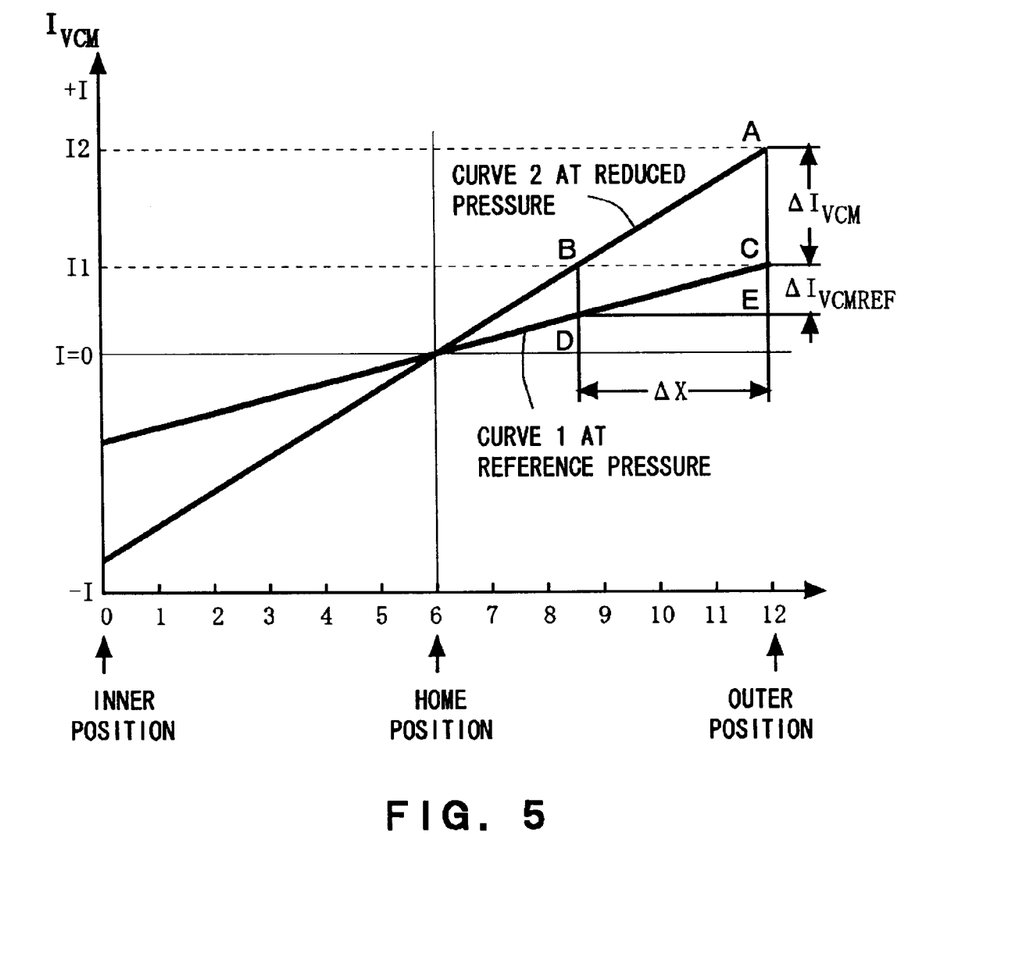
FIG. 5 shows the current applied to the VCM.

The values of current applied to the VCM 11 by the VCM/spindle driver 14 are shown in FIG. 5 as Curve 1 and Curve 2. A vertical axis indicates the values of the current $I_{VCM}$ applied to the VCM 11, and a horizontal axis indicates the radial cylinder positions along the radial of the magnetic recording disk 1. For simplifying the description, only thirteen cylinder positions "0" through "12" are shown in FIG. 5.

As stated above, when the current applied to the VCM 11 is equal to "0" value, the head 9 is positioned at the home cylinder position "6" by the bias force of the flexible cable 10.

The Curve 1 indicates the current required to move the head support arm 4 under the reference atmospheric pressure on the ground. The values of the Curve 1 is stored in the memory 17 at the shipment of the hard disk drive device.

The Curve 2 indicates one example of the values detected by the main control circuit 16. It is assumed that the values of the Curve 2 are detected in the air plane flying at the high altitude, i.e., in a reduced atmospheric pressure which is lower than the reference atmospheric pressure. The main control circuit 16 shown in FIG. 4 detects the values of the Curve 2 during the Power On Reset (POR) in accordance with the present invention. The POR means a period from the time of the power on by the operator to the time of the start of the read/write operation. During the POR, the operation in accordance with the present invention and other diagnostic operation are performed.

Figure 6:
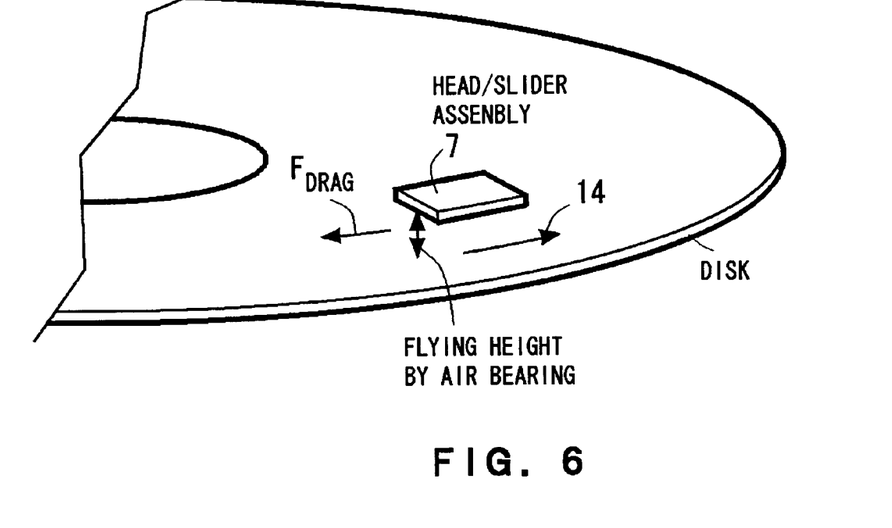
FIG. 6 shows the drag force $F_{DRAG}$.

FIG. 6 shows the space between the head 9 and the surface of the disk 1 (the flying height of the head 9) which is maintained by the pressure of the air bearing generated by the rotation of the magnetic recording disk 1 in the direction of arrow 14. It is noted that the pressure of the air bearing is a function of the atmospheric pressure. Due to the air bearing, a drag force $F_{DRAG}$ is generated which tends to drag the head/slider assembly 7 in a tangential direction, and the value of the drag force $F_{DRAG}$ changes depending upon the surrounding atmospheric pressure of the hard disk drive device. Assuming that the rotational speed, the RPM, of the disk 1 is maintained at the constant value, the flying height of the head/slider assembly 7 decreases as the atmospheric pressure decreases, so that the risk of the stiction of the head/slider assembly 7 to the surface of the magnetic recording disk 1 is increased in the error recovery mode.

Again, referring to FIG. 3, when the head 9 is positioned at the home cylinder position "6" or the center line 13, the drag force $F_{DRAG}$ is parallel to the center line 13 which is a tangential line to the home cylinder position "6". As the head 9 is advanced from the home cylinder position "6" to "12", a lateral vector $F2=F_{DRAG} \cos \theta$ is generated. At the outer most cylinder position "12" and the inner most cylinder position "0", the lateral vector F2 has the maximum value. For simplifying the drawing, only the lateral vector F2 at the outer cylinder position "12" is shown. This lateral vector F2 tends to return the head support arm 4 towards the home cylinder position "6".

Another force for returning the head support arm 4 to the home cylinder position "16" is generated by the flexible cable 10. When the head support arm 4 is moved towards the outer cylinder position "12", the flexible cable 10 is bent as shown by the dashed line 10' in FIG. 3 and generates a force F1 which tends to return the head support arm 4 to the home cylinder position "6".

Therefore, the force $F_{RETURN}$ tending to return the head support arm 4 to the home cylinder position "6" when the head 9 is positioned at the outer cylinder position "12" is represented by the next formula.

$$F_{RETURN} = F1 + F2 = F1 + F_{DRAG} \cos \theta$$

To keep the head support arm 4, and hence the head 9, in the reference atmospheric pressure at the outer most cylinder position "12", a current I1 must be applied to the VCM 11 so that the force generated by the current I1 balances with the total force $F_{RETURN}$.

To determine the value of the current applied to the VCM 11, it is assumed that the head 9 is positioned at the outer cylinder position "12". The main control circuit 16 sends a command indicating "position the head 9 at the cylinder position 12" to the hard disk control circuit 15. The hard disk control circuit 15 controls the VCM/spindle driver 14 to gradually increase the value of the current to the VCM 11 to move the head support arm 4 from the home cylinder position "6" towards the outer most cylinder position "12".

As the head 9 is moved across the cylinder positions "1", "2", "3", ..., "12", a signal indicating the cylinder position is sensed by the head 9; and this position signal is decoded by the read/write circuit 12 and sent to the main control circuit 16 through the hard disk control circuit 15. Also, the values indicating the current applied to the VCM 11 are supplied to the main control circuit 16. In this manner, the main control circuit 16 knows the values on the Curve 1; that is, the value of the current applied to the VCM 11 required to position the head 9 at each cylinder position "0", "1", "2", "3", "4", "5", "6", "7", ..., "11" and "12" in the reference atmospheric pressure.

This measurement of the values of the Curve 1 is made in the factory when the hard disk drive device is on the ground in the reference atmospheric pressure before the shipment of the device, and the values of the Curve 1 are stored in the memory 17 as the reference values.

The stored values of Curve 1 are compared with the values of the Curve 2 which are detected by the main control circuit 18 during the POR of the computer. Describing the Curve 2, it is assumed that the personal computer is operated in the air plane flying at the high altitude, i.e., the reduced atmospheric pressure. The following phenomenon occurs due to the decrease of the atmospheric pressure. This phenomenon is described by using an exemplary operation for positioning the head 9 at the outer cylinder position "12".

Since the value of the atmospheric pressure is decreased, the pressure of the air bearing between the head/slider assembly 7 and the surface of the disk 1 at the cylinder position "12" is decreased. The decrease of the pressure of the air bearing causes a decrease in the flying height of the head/slider assembly 7, so that the drag force $F_{DRAG}$ shown in FIG. 3 becomes large. As the drag force $F_{DRAG}$ increases, the lateral vector $F2 = F_{DRAG} \cos \theta$ is increased, so that the head/slider assembly 7 is pulled toward the home cylinder position "6" from the cylinder position "12". Since this deviation of the head 9 from the cylinder position "12" is undesirable, the main control circuit 16 increases the current applied to the VCM 11 to keep the head 9 at the cylinder position "12". The main control circuit 16 knows the value of this increased current, as described hereinbefore. That is, the main control circuit 16 can detect the increased current. This detected current at the outer cylinder position "12" is shown as the current I2 in FIG. 5.

The main control circuit 16 detects the increased currents at each cylinder position "0", "1", "2", "6", "11" and "12" of the disk 1, and stores these values as the Curve 2 in the memory during the POR period. These values are compared with the values of the Curve 1. FIG. 5 indicates the comparison of the value of the Curve 2 with the value of the Curve 1 at the cylinder position 12, and the value $\Delta I_{VCM}$ represents the difference between the value of the Curve 2 and the value of the Curve 1 at the cylinder position "12".

Figure 7:
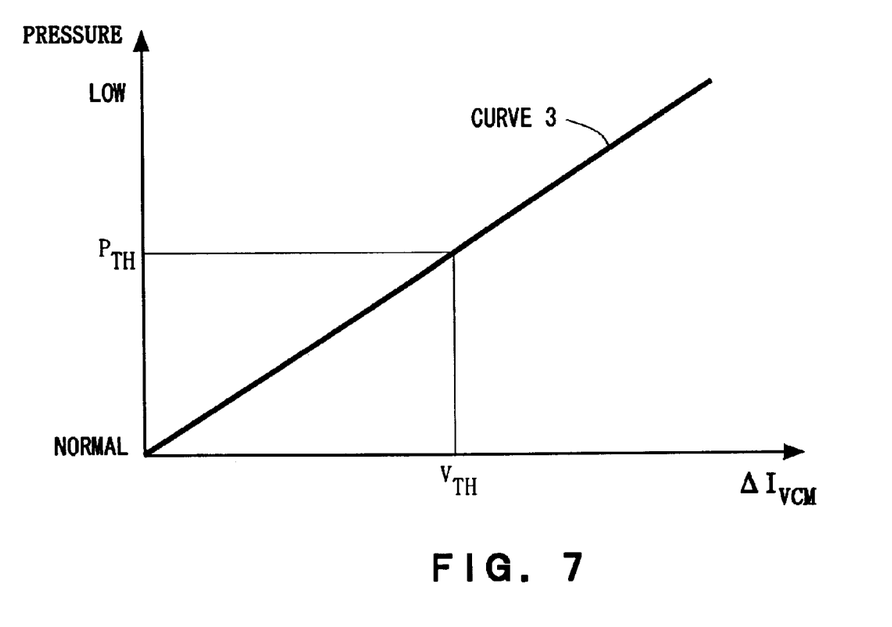
FIG. 7 shows the difference value $\Delta I_{VCM}$ and the atmospheric pressure.

It is required to obtain the value of the actual atmospheric pressure from the difference value $\Delta I_{VCM}$ to determine whether the error recovery mode can be started. To this end, the values of the Curve 3 shown in FIG. 7 are stored in the memory 17 before the shipment of the hard disk drive device. These values of the Curve 3 are obtained by measuring the current $I_{VCM}$ applied to the VCM 11 for keeping the head 9 at the cylinder position 12 and calculating the difference value $\Delta I_{VCM}F$, in the manner as described before, when the atmospheric pressure is decreased from the reference atmospheric pressure on the ground to an expected lowest pressure. The values of the atmospheric pressure and the value of $\Delta I_{VCM}$ on the Curve 3 are stored in the memory 17 as the conversion table.

A threshold value $P_{TH}$ of the atmospheric pressure is established, as shown in FIG. 7. When the value of the detected difference value $\Delta I_{VCM}$ is equal to a threshold value $V_{TH}$, the pressure is equal to the threshold value $P_{TH}$. The threshold value $P_{TH}$ indicates the value for inhibiting the error recovery operation. If a pressure corresponding to the detected difference value $\Delta I_{VCM}$ is smaller than the threshold value $P_{TH}$, the error recovery process should be inhibited. The reasons for inhibiting the error recovery process is that at the pressure lower than the threshold value $P_{TH}$, the risk of the sticking of the head/slider assembly 7 onto the surface of the magnetic recording disk 1 is increased.

Although the value $\Delta I_{VCM}$ representing the difference between the value of the Curve 2 and the value of the Curve 1 at the cylinder position "12" is used to detect the atmospheric pressure, a slope or inclination of the Curve 2 can be compared with the slope of the Curve 1. Explaining this comparison with reference to FIG. 5, a triangle defined by three points A, B and C, and a triangle defined by three points C, D and E are shown. The length between the points B and C and the length between the points D and E are equal to $\Delta X$. The length between the points C and E is called as $\Delta_{VCMREF}$. The slope K of the Curve 2 is represented by the following expression.

$$K = \Delta I_{VCM} / \Delta X$$

The slope $K_{REF}$ of the Curve 1 is represented by the following formula.

$$K_{REF} = \Delta I_{VCMREF} / \Delta X$$

When the value of the K is equal to the value of the $K_{REF}$, the detected atmospheric pressure is equal to the reference atmospheric pressure on the ground. The atmospheric pressure is equal to the threshold value $P_{TH}$ at $K_{REF}+\alpha$ and the value of K is compared with the value of the $K_{REF}+\alpha$.

Figure 8:
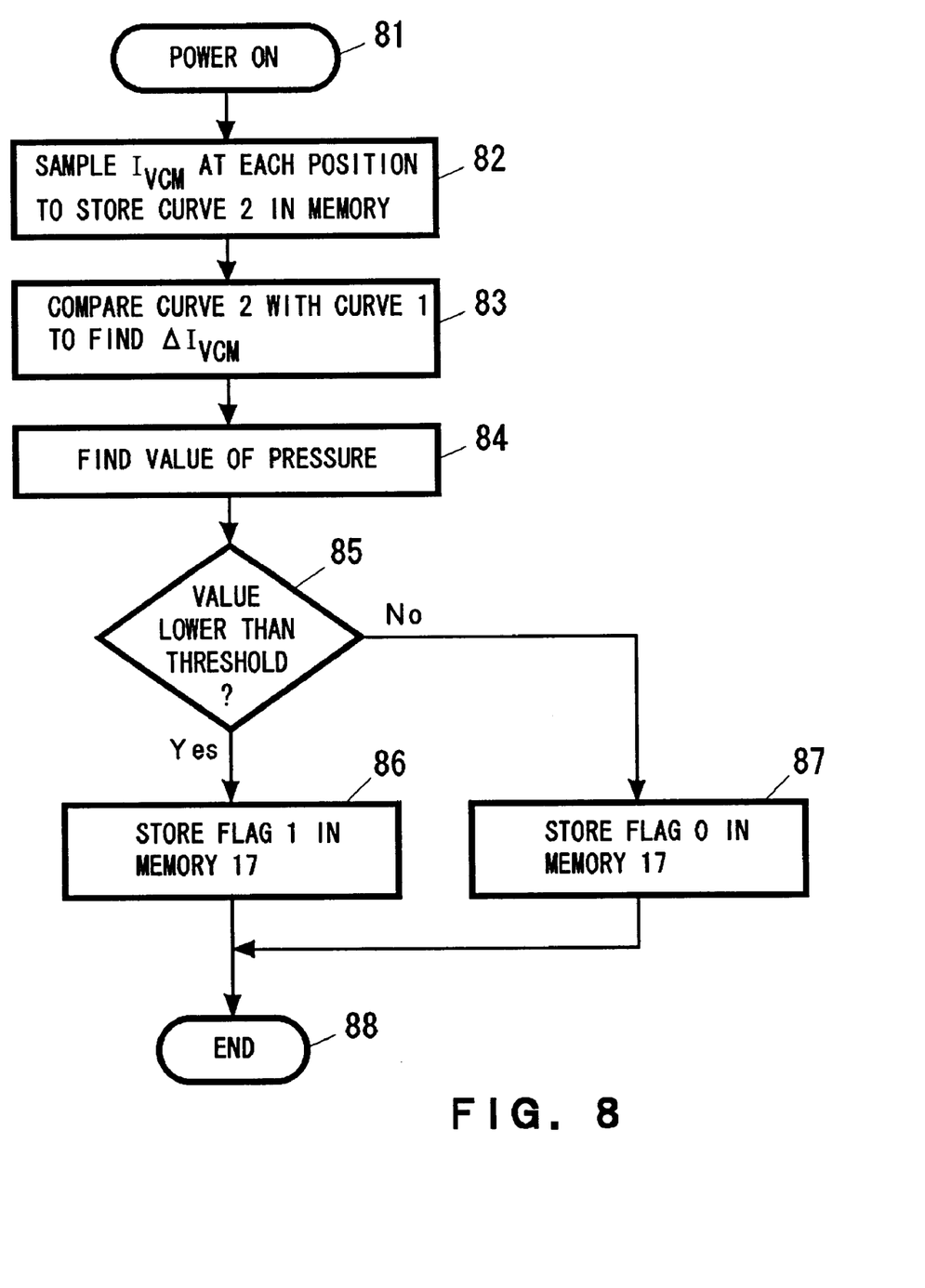
FIG. 8 shows the flow chart of the operation performed during the POR period in accordance with the present invention.

FIG. 8 shows a flow chart of the operation of the hard disk drive device performed during the POR period in accordance with the present invention. In a block 81, the POR period is started; and the main control circuit 16 of the hard disk drive device is informed of the start of the POR by CPU of the personal computer. The operation proceeds to a block 82 in which the main control circuit 16 detects the increased currents to the VCM 11 at each cylinder position "0", "1", "2", "3", "6", "10", "11" and "12" of the disk 1; and stores these values as the Curve 2 in the memory 17. The operation proceeds to a block 83 in which the main control circuit 16 compares the value of the Curve 2 with the value of the Curve 1 at the cylinder position 12, and finds out the value $\Delta I_{VCM}$ which represents the difference between the value of the Curve 2 and the value of the Curve 1 at the cylinder position 12. The operation then proceeds to a block 84 in which the main control circuit 16 finds out the value of the actual atmospheric pressure from the difference value $\Delta I_{VCM}$ based upon the Curve 3 shown in FIG. 7. The operation proceeds to a block 85 in which the main control circuit 16 determines whether the detected value of the actual atmospheric pressure is lower than the threshold value $P_{TH}$ shown in FIG. 7. Depending upon the detected value of the atmospheric pressure, the information, such as Flag 1 or Flag 0, indicating whether the detected value of the atmospheric pressure is lower than the threshold value $P_{TH}$ or not, is stored in the memory 17 during the POR period. If the detected value of the actual atmospheric pressure is lower than the threshold value $P_{TH}$, the information, such as the Flag 1, is stored in the memory 17 in the block 86. If the detected value of the atmospheric pressure is larger than the threshold value $P_{TH}$, the information, such as the Flag 0, indicating this status stored in the memory 17 in the block 87. The operation performed during the POR is terminated in the block 88.

Figure 9:
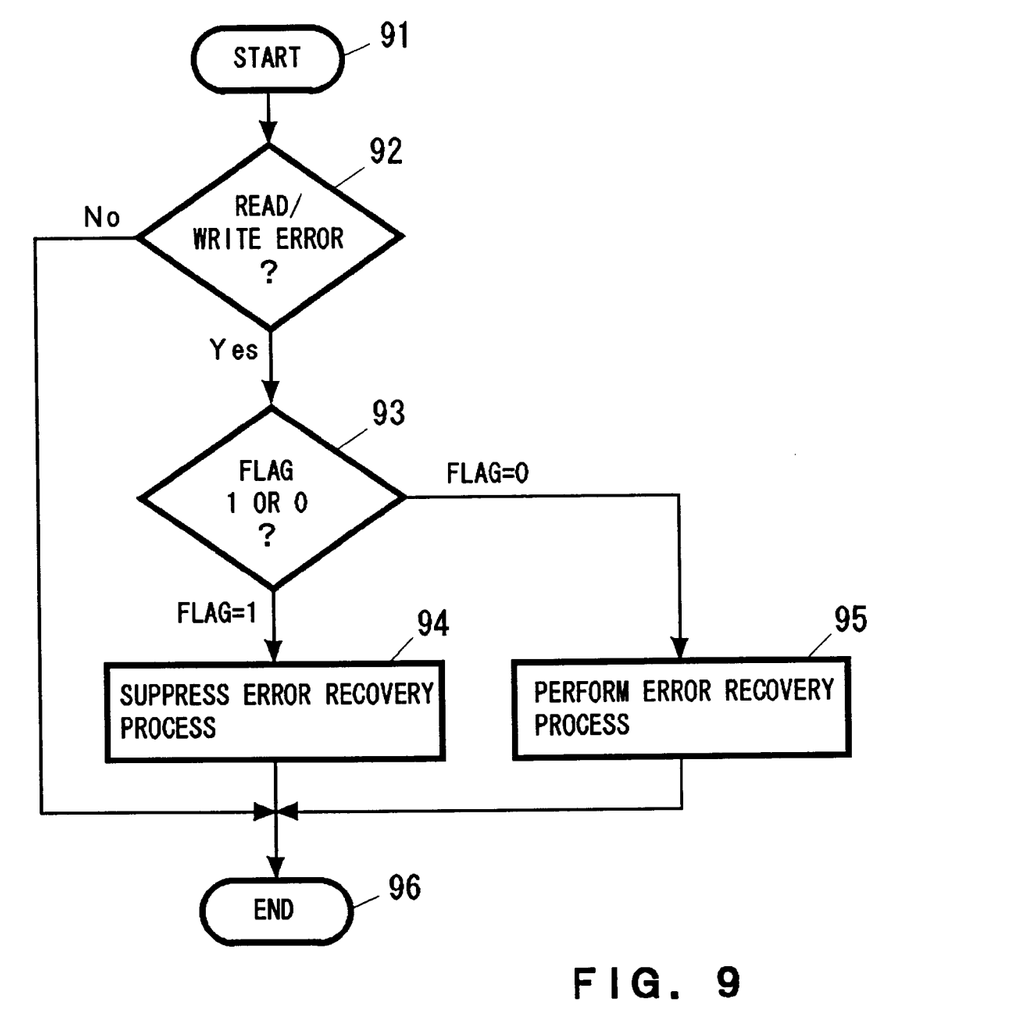
FIG. 9 shows the flow chart of the operation performed during the read/write period in accordance with the present invention.

During the read/write period after the termination of the POR period, the main control circuit 16 performs the operations of the blocks 91 through 96 shown in FIG. 9. The operation is started in the block 91 and proceeds to the block 92 in which the main control circuit 16 determines whether the read/write error is detected. If the answer of the block 92 is NO, the operation proceeds to the block 96, in which the operation is terminated. If the answer of the block 92 is YES, the operation proceeds to the block 93, in which the flag stored in the memory 17 is determined. If the flag is equal to "1", that is the detected value of the atmospheric pressure is lower than the threshold value $P_{TH}$, the operation proceeds to the block 94 in which the error recovery operation is inhibited, and the operation is terminated in the block 96. If the flag is equal to "0", that is the detected value of the atmospheric pressure is higher than the threshold value $P_{TH}$, the operation proceeds to the block 95 in which the error recovery operation is performed, and the operation is terminated in the block 96.

The present invention solves the problem found by the inventors of the present invention that the sticking of the head/slider assembly 7 to the surface of the magnetic recording disk 1 tends to occur when the hard disk drive device starts the error recovery mode when the personal computer having this hard disk drive device is used in an airplane flying at a high altitude or in an atmosphere of a high temperature causing the buoyancy of the air bearing to be decreased.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for controlling the read/write operation of a disk drive device in which a read/write head mounted on a head support arm flies above a surface of a rotating recording disk to read data from or write data to the disk, the head support arm movable by a driver along a radial direction of the recording disk, the method comprising steps of:
    (i) detecting the value of the surrounding atmospheric pressure before a read/write period;
    (ii) storing information indicating whether the detected value of the atmospheric pressure is lower than a threshold value;
    (iii) accessing, during a read/write period, the stored information; and
    (iv) prohibiting an operation for lowering the flying height of the read/write head to a height which is lower than the height for the read/write operation when the detected value of the atmospheric pressure is lower than the threshold value.

2. A method for controlling the operation of a disk drive device according to claim 1, wherein the step of detecting a value of the atmospheric pressure includes steps of:
    (i) detecting a current value applied to the driver to keep the read/write head at a selected radial position;
    (ii) comparing the detected current value with a reference current value which represents a current value applied to the driver to keep the read/write head at the selected radial position at a reference atmospheric pressure to generate a difference value between the detected current value and the reference current value; and
    (iii) comparing the difference value with a threshold value to generate the information.

3. A method for controlling the operation of a disk drive device in which a read/write head mounted on a head support arm flies above a surface of a rotating recording disk to read data from or write data to the disk, the head support arm movable by a driver along a radial direction of the recording disk, the method comprising steps of:
    (i) detecting a current value applied to the driver to keep the read/write head at a selected radial position;
    (ii) comparing the detected current value with a reference current value which represents a current value applied to the driver to keep the read/write head at the selected radial position at a reference atmospheric pressure to generate a difference value between the detected current value and the reference current value; and
    (iii) prohibiting an operation for lowering the flying height of the read/write head when the difference value exceeds a threshold value.

4. A method for controlling the operation of a disk drive device according to claim 3, wherein the detecting step and comparing step are performed during a power on reset period before a read/write period.

5. A method for controlling the operation of a disk drive device according to claim 3, wherein step (iii) is performed during a read/write period.

6. A disk drive device in which a read/write head mounted on a head support arm flies above a surface of a rotating recording disk, and the head support arm is movable by a head moving means along a radial direction to position the read/write head at a radial position above the recording disk, the disk drive device comprising:

means for detecting a value of atmospheric pressure during a power on reset period before a read/write period;

means for storing information indicating whether the detected value of the atmospheric pressure is lower than a threshold value; and means for accessing, during the read/write period, the stored information to determine whether an operation for lowering a flying height of the read/write head to a height which is lower than a height for the read/write operation should be prohibited.

7. A disk drive device according to claim 6, wherein the means for detecting a value of the atmospheric pressure includes:

means for detecting a current value applied to the head moving means to keep the read/write head at the radial position;

means for comparing the detected current value with a reference current value which represents a current value applied to the head moving means to keep the read/write head at the radial position at a reference atmospheric pressure to generate a difference value between the detected current value and the reference current value; and means for comparing the difference value with a threshold value to generate the stored information.

* * * * *